(12) United States Patent
Lin (10) Patent No.: US 10,890,752 B2
(45) Date of Patent: Jan. 12, 2021

(54) OPTICAL PATH TURNING MODULE

(71) Applicants: Sintai Optical (Shenzhen) Co., Ltd., ShenZhen (CN); Asia Optical Co., Inc., Taichung (TW)

(72) Inventor: Guo-Quan Lin, ShenZhen (CN)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 266 days.

(21) Appl. No.: 16/226,948

(22) Filed: Dec. 20, 2018

(65) Prior Publication Data

US 2019/0243120 A1 Aug. 8, 2019

(30) Foreign Application Priority Data

| Feb. 7, 2018 | (CN) | 2018 2 0215207 U |
| Mar. 28, 2018 | (CN) | 2018 2 0433827 U |
| Apr. 26, 2018 | (CN) | 2018 2 0612755 U |
| Jul. 10, 2018 | (TW) | 107123790 A |

(51) Int. Cl.
| G02B 23/02 | (2006.01) |
| G02B 23/08 | (2006.01) |
| G02B 23/10 | (2006.01) |
| G02B 23/24 | (2006.01) |

(52) U.S. Cl.
CPC ........... *G02B 23/08* (2013.01); *G02B 23/10* (2013.01); *G02B 23/2407* (2013.01); *G02B 23/2476* (2013.01)

(58) Field of Classification Search
CPC .... G02B 23/08; G02B 23/10; G02B 23/2407; G02B 23/2476; G02B 13/0065; G02B 7/1805; G02B 26/0816
USPC .......................................... 359/403
See application file for complete search history.

(56) References Cited

U.S. PATENT DOCUMENTS

| 2018/0024329 A1* | 1/2018 | Goldenberg ....... H04N 5/23258 359/557 |
| 2019/0361323 A1* | 11/2019 | Jerby ..................... G03B 17/17 |

* cited by examiner

*Primary Examiner* — William R Alexander
*Assistant Examiner* — Henry A Duong
(74) *Attorney, Agent, or Firm* — McClure, Qualey & Rodack, LLP (57) ABSTRACT

An optical path turning module includes an optical path turning unit, a carrier, a fixing element and a driver. The optical path turning unit includes a sloping surface. A light beam enters the optical path turning unit along a first axis, is reflected by the sloping surface, and leaves the optical path turning unit along a second axis. The carrier is configured to fix the optical path turning unit and includes a main body and a plurality of first clamping portions. The main body is sloped with respect to the second axis, and the first clamping portions extend from the main body in a direction parallel to the second axis. The carrier is disposed in the fixing element. The driver is configured to drive the carrier to rotate about a third axis with respect to fixing element. The third axis is perpendicular to the first axis and the second axis.

20 Claims, 8 Drawing Sheets

OPTICAL PATH TURNING MODULE

BACKGROUND OF THE INVENTION

Field of the Invention

The invention relates to an optical path turning module, and more particularly to an optical path turning module for a periscope.

Description of the Related Art

Because a conventional optical path turning module mostly consists of plastic elements, the overall structural strength of the conventional optical path turning module is not high. The thickness of the plastic elements can be increased to increase the structural strength of the optical path turning module. However, it is disadvantageous to miniaturization of the optical path turning module. Therefore, improvements of the structure of the optical path turning module are required.

BRIEF SUMMARY OF THE INVENTION

The invention provides an optical path turning module, wherein the thickness thereof is reduced, yet the strength thereof is increased.

An optical path turning module in accordance with an embodiment of the invention includes an optical path turning unit, a carrier, a fixing element and a driver. The optical path turning unit includes a sloping surface, wherein a light beam enters the optical path turning unit along a first axis, is reflected by the sloping surface for changing a traveling direction thereof, and leaves the optical path turning unit along a second axis. The carrier is configured to fix the optical path turning unit and includes a main body, a plurality of first clamping portions and a plurality of second clamping portions, wherein the main body is sloped with respect to the second axis, the first clamping portions extend forwards from two sides of the main body in a direction parallel to the second axis, and the second clamping portions extend obliquely and upwards from two sides of the main body and clamp the optical path turning unit. The carrier is disposed in the fixing element. The driver is disposed between the carrier and the fixing element and is configured to drive the carrier to rotate about a third axis with respect to fixing element, wherein the third axis is perpendicular to the first axis and the second axis.

In another embodiment, the carrier further includes a plurality of locating portions extending outwards from two sides of the main body in a direction parallel to the third axis.

In yet another embodiment, the optical path turning unit further includes a top surface, a left surface, a right surface and a front surface, the first clamping portions include a plurality of first parts and a plurality of second parts, the first parts clamp the left surface and the right surface, and the second parts are placed against the front surface. The second clamping portions clamp the left surface and the right surface.

In another embodiment, the locating portions include a supporting portion and a pivoting portion, the supporting portion extends outwards from the main body, and the pivoting portion extends obliquely and downwards from a center of a bottom surface of the supporting portion.

In yet another embodiment, the fixing element includes a plurality of fixing bodies, each of the fixing bodies is provided with a recess configured to accommodate the locating portion and including two supporting surfaces, a space and two limiting portions, the supporting surfaces are configured to support the supporting portion, the space is between the supporting surfaces and is configured to allow rotation of the pivoting portion, and the limiting portions are disposed obliquely above the supporting surfaces and are placed against a part of a top surface of the second clamping portion.

In another embodiment, the optical path turning module further includes a plurality of enhancing elements, wherein each of the enhancing elements includes a top part and a lateral part, the top part is disposed on the top surface and is connected to the lateral part, and the lateral part is fixed on the left surface or the right surface and extends to a top surface of the first clamping portions.

In yet another embodiment, each of the lateral parts is provided with a notch configured to engage with the second clamping portion, and an internal edge of the notch contacts at least one part of outer surfaces of the second clamping portion.

In another embodiment, the left surface and the right surface of the optical path turning unit are completely covered by the lateral parts, the second clamping portions and the first parts of the first clamping portions.

In yet another embodiment, the top parts of the enhancing elements are arranged in a non-effective-diameter area of the top surface.

In another embodiment, a bottom edge of the enhancing elements is arranged to contact a top surface of the first parts of the first clamping portions.

In yet another embodiment, the optical path turning unit further includes a reflecting element and an adhesive layer, the adhesive layer is between the reflecting element and the sloping surface, and the sloping surface, the adhesive layer and the reflecting element are sequentially arranged.

In another embodiment, the optical path turning unit further includes a reflecting layer coating on the reflecting element, and the reflecting layer is reflecting film.

In yet another embodiment, a first angle at which the top surface and the front surface are intersected is greater than a second angle at which the sloping surface and the top surface or the front surface are intersected.

In another embodiment, the reflecting element is glass sheet, a surface of the reflecting element facing the sloping surface is attached to the sloping surface through the adhesive layer, and another surface of the reflecting element opposite to the sloping surface is coated with the reflecting layer.

In yet another embodiment, the light beam enters the optical path turning unit through the top surface, passes through the sloping surface, the adhesive layer and the reflecting element, is reflected by the reflecting layer for changing the optical path thereof, passes through the reflecting element, the adhesive layer and the sloping surface again, and leaves the optical path turning unit through the front surface.

In another embodiment, the reflecting element is metal sheet, a surface of the reflecting element facing the sloping surface is coated with the reflecting layer, and the reflecting layer is attached to the sloping surface through the adhesive layer.

In yet another embodiment, the light beam enters the optical path turning unit through the top surface, passes through the sloping surface and the adhesive layer, is mostly reflected by the reflecting layer for changing the optical path thereof, passes through the adhesive layer and the sloping surface again, and leaves the optical path turning unit through the front surface, and a minority of the light beam passes through the reflecting layer, is reflected by the reflecting element for changing the optical path thereof, passes through the reflecting layer, the adhesive layer and the sloping surface again, and leaves the optical path turning unit through the front surface.

In another embodiment, the second clamping portions include a first part, a second part and a third part, the first part extends obliquely and upwards from the main body, and the second part and the third part respectively extend vertically from two ends of the first part. The carrier further includes a plurality of locating portions extending outwards from two sides of the main body in a direction parallel to the third axis, the locating portions include a supporting portion and a pivoting portion, the supporting portion extends outwards from the main body, and the pivoting portion extends obliquely and downwards from a center of a bottom surface of the supporting portion. The fixing element includes a plurality of fixing bodies, each of the fixing bodies is provided with a recess configured to accommodate the locating portion and including two supporting surfaces, a space and two limiting portions, the supporting surfaces are configured to support the supporting portion, the space is between the supporting surfaces and is configured to allow rotation of the pivoting portion, and the limiting portions are disposed obliquely above the supporting surfaces and are placed against a part of a top surface of the second clamping portion.

In yet another embodiment, the carrier further includes a plurality of first protruding portions and a plurality of second protruding portions, the first protruding portions respectively extend backwards from two sides of a top portion of the main body in the direction parallel to the second axis, and the second protruding portions respectively extend downwards from two sides of a bottom portion of the main body in a direction parallel to the first axis.

In another embodiment, the fixing element further includes a back plate and a bottom plate, the back plate includes a plurality of first depressed portions configured to engage with the first protruding portions, and the bottom plate includes a plurality of second depressed portions configured to engage with the second protruding portions.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
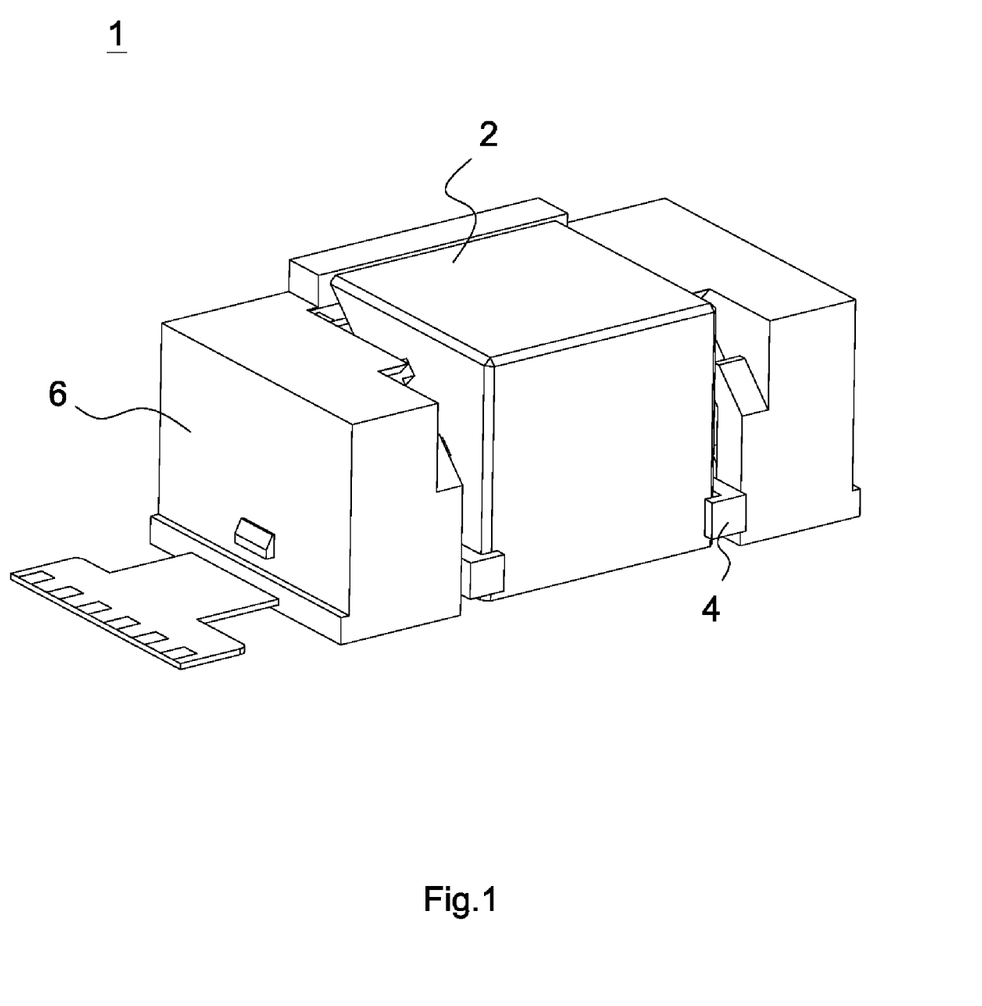
FIG. 1 is a schematic view of an optical path turning module in accordance with a first embodiment of the invention.

Referring to FIG. 1, an optical path turning module 1 in accordance with a first embodiment of the invention includes an optical path turning unit 2, a carrier 4, a fixing element 6 and a driver (not shown). In operation, a light beam (not shown) enters the optical path turning module 1 along a first axis (not shown), travels in the optical module 1 in which the traveling direction thereof is changed, leaves the optical path turning module 1 along a second axis (not shown), enters a camera module (not shown), and is received by an imaging unit (not shown) of the camera module.

Figure 2:
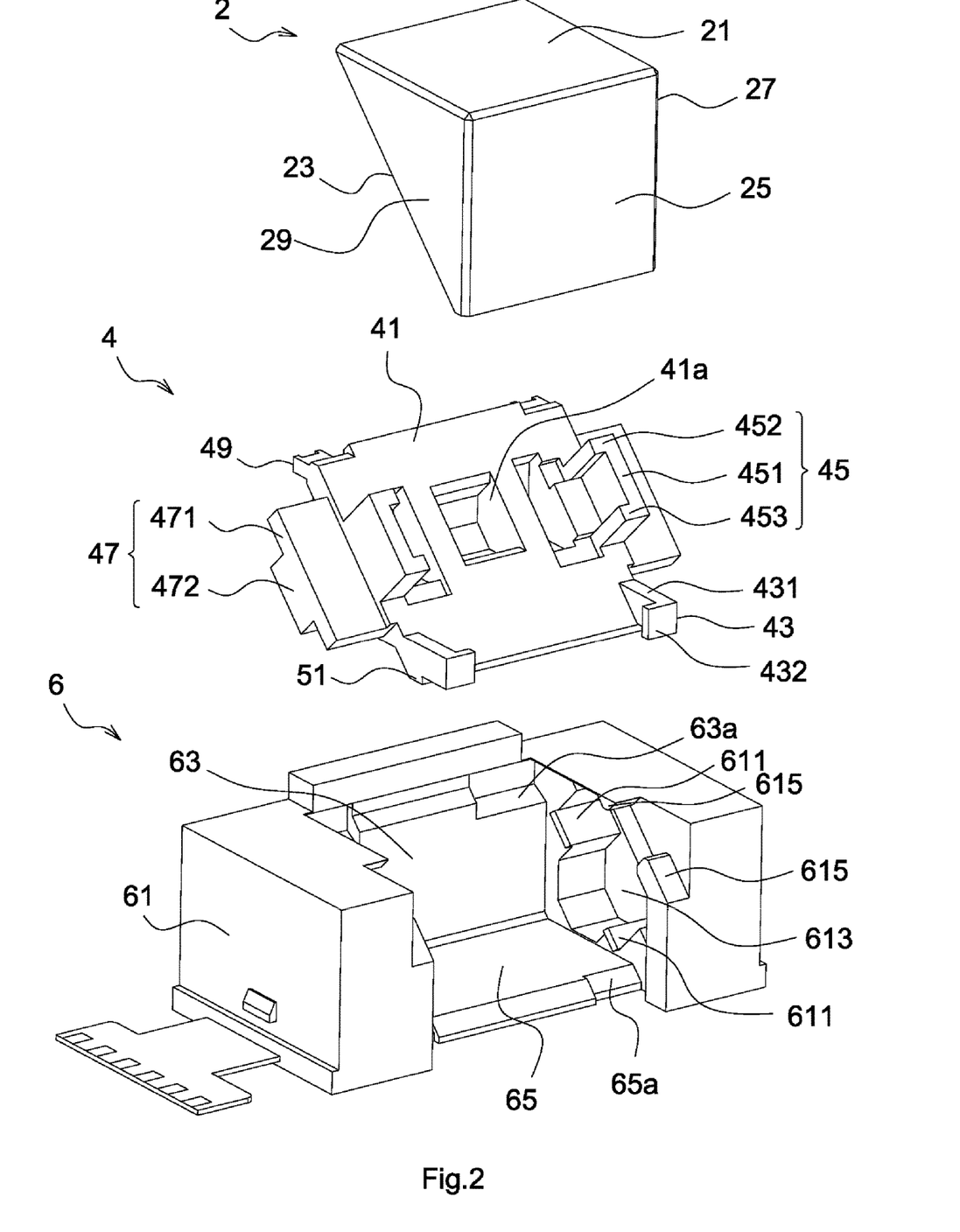
FIG. 2 is an exploded view of the optical path turning module of FIG. 1.

Referring to FIG. 2, the optical path turning unit 2 includes a top surface 21, a sloping surface 23, a front surface 25, a left surface 27 and a right surface 29. The optical path turning unit 2 can be rotated about a third axis (not shown) with respect to the fixing element 6 for adjusting an angle at which the light beam enters the optical path turning unit 2. Therefore, the light beam is able to enter the optical path turning module 1 through the top surface 21 along the first axis, is reflected by the sloping surface 23 for changing the traveling direction, and leaves the optical path turning unit 2 through the front surface 25 along the second axis. In the first embodiment, the first axis is perpendicular to the second axis, and the third axis is perpendicular to the first axis and the second axis. The optical path turning unit 2 is, for example, a prism, reflecting mirror or refracting mirror.

The carrier 4 includes a main body 41, two first clamping portions 43, two second clamping portions 45, two locating portions 47, two first protruding portions 49 and two second protruding portions 51. The main body 41 is sloped with respect to the second axis and includes a light penetrating hole 41a configured to allow light to pass through. The first clamping portions 43 respectively extend from two sides of the main body 41 in a direction parallel to the second axis. Each of the first clamping portions 43 includes a first part 431 and a second part 432, wherein the first part 431 is perpendicular to the second part 432, so that each of the first clamping portions 43 is bent. Preferably, each of the first clamping portions 43 is L-shaped. The second clamping portions 45 extend obliquely and upwards from two sides of the main body 41 and are perpendicular to the main body 41. Each of the second clamping portions 45 includes a first part 451, a second part 452 and a third part 453, wherein the first part 451 extends obliquely and upwards from the main body 41, and the second part 452 and the third part 453 respectively extend vertically from two ends of the first part 451. In another embodiment, each of the second clamping portions 45 is plate-shaped and has a predetermined thickness. The locating portions 47 respectively extend from two sides of the main body 41 in a direction parallel to the third axis. Each of the locating portions 47 is T-shaped, when observed in the direction parallel to the third axis, and includes a supporting portion 471 and a pivoting portion 472. The supporting portion 471 is parallel to the main body 41. Preferably, the supporting portion 471 and the main body 41 are arranged on the same plane. The pivoting portion 472 extends obliquely and downwards from a center of a bottom surface of the supporting portion 471. The first protruding portions 49 respectively extend backwards from two sides of a top portion of the main body 41 in the direction parallel to the second axis. Preferably, the first protruding portions 49 extend horizontally and backwards. The second protruding portions 51 respectively extend downwards from two sides of a bottom portion of the main body 41 in a direction parallel to the first axis and protrude from a bottom portion of the first clamping portions 43.

The fixing element 6 includes two fixing bodies 61, a back plate 63 and a bottom plate 65. Each of the fixing bodies 61 includes a recess, and the recess includes two supporting surfaces 611, a space 613 and two limiting portions 615. The space 613 is between the supporting surfaces 611 and is configured to allow rotation of the pivoting portion 472 of the locating portion 47. The limiting portions 615 are disposed obliquely above the supporting surfaces 611. The back plate 63 includes two first depressed portions 63a configured to engage with the first protruding portions 49 of the carrier 4. The bottom plate 65 includes two second depressed portions 65a configured to engage with the second protruding portions 51.

During assembly of the optical path turning module 1, the optical path turning unit 2 is fixed in the carrier 4, the carrier 4 is disposed in the fixing element 6 to carry the optical path turning unit 2, and the driver is disposed between the carrier 4 and the fixing element 6 for driving the carrier 4 to rotate about the third axis with respect to the fixing element 6. When the optical path turning unit 2 is fixed in the carrier 4, the main body 41 and the sloping surface 23 of the optical path turning unit 2 are parallel to each other and placed against each other. In the first embodiment, the main body 41 and the sloping surface 23 are sloped at 45 degrees with respect to the second axis. The first parts 431 of the first clamping portions 43 clamp the left surface 27 and the right surface 29 of the optical path turning unit 2, and the second parts 432 of the first clamping portions 43 are placed against the front surface 25 of the optical path turning unit 2 so that the optical path turning unit 2 is constrained from moving in the direction parallel to the second axis. The second parts 452 and the third parts 453 of the second clamping portions 45 are placed against the left surface 27 and the right surface 29 of the optical path turning unit 2 so that the optical path turning unit 2 is constrained from moving in the direction parallel to the third axis. Further, the carrier 4 is disposed in the fixing element 6 as shown in FIG. 1, wherein the recess accommodates the locating portion 47 of the carrier 4, the supporting surfaces 611 support the supporting portion 471 of the locating portion 47, and the limiting portions 615 are placed against a part of a top surface of the second clamping portion 45 of the carrier 4. When the driver drives the carrier 4 to rotate about the third axis with respect to the fixing element 6, the carrier 4 is rotated upwards in a limited range.

In this embodiment, the driver is a combination of a coil, a position sensor and a magnet disposed with respect to the coil. In another embodiment, the driver is a VCM (voice-coil motor) or a piezoelectric material.

During assembly of the optical path turning module 1, the carrier 4 in which the optical path turning unit 2 is fixed is placed against the back plate 63 and the bottom plate 65 of the fixing element 6, and then fitted to the fixing bodies 61. However, it is understood that the invention is not limited thereto.

It is worth noting that the carrier 4 is disposed on inner surfaces of the fixing element 6 through the locating portions 47. The first clamping portions 43 of the carrier 4 are placed against the front surface 25 of the optical path turning unit 2, rather than placed against a bottom surface of the optical path turning unit that is performed in the prior art. Therefore, the height of the optical path turning unit 2 and the thickness of the optical path turning module 1 are reduced.

Figure 3:
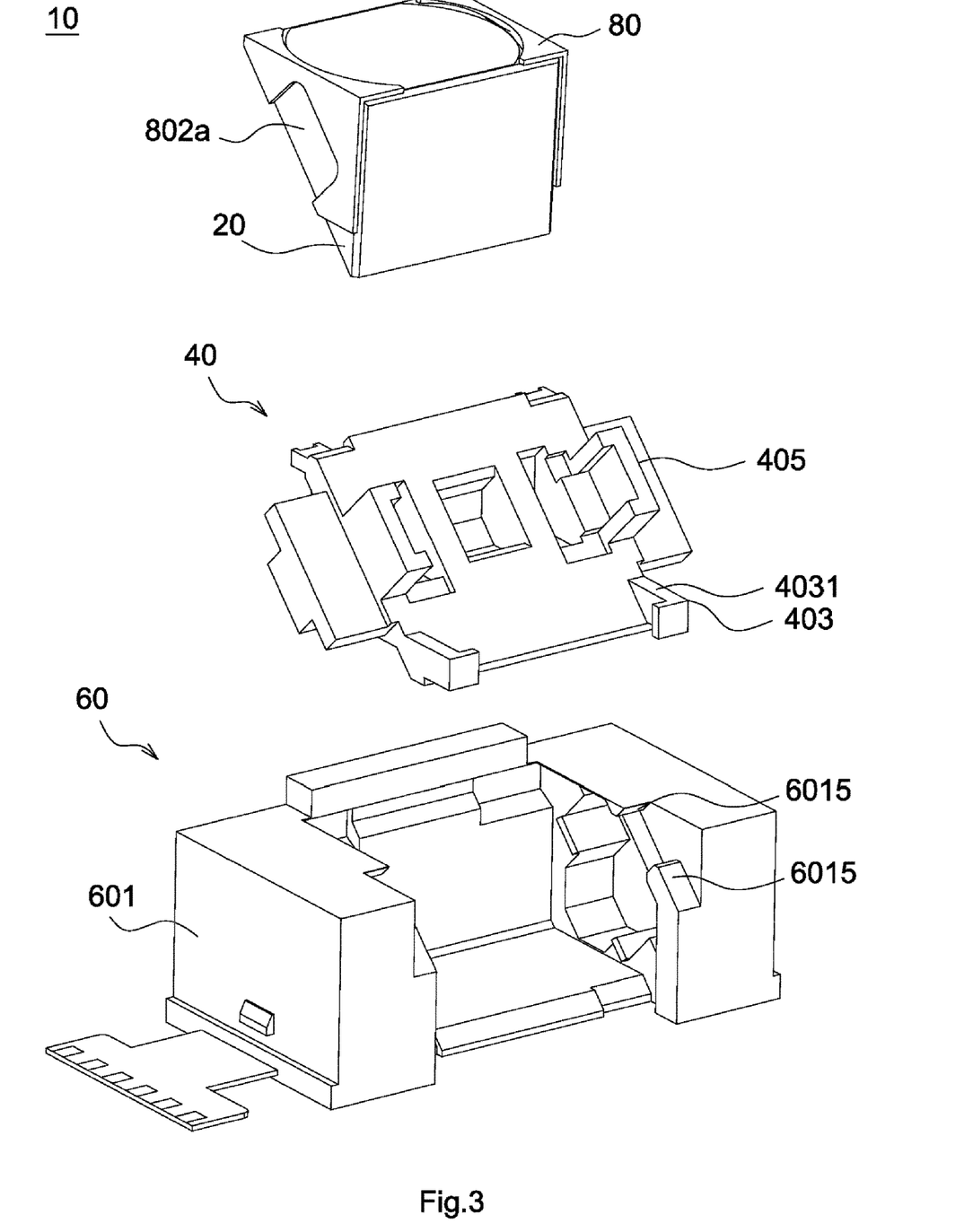
FIG. 3 is an exploded view of an optical path turning module in accordance with a second embodiment of the invention.

Referring to FIG. 3, an optical path turning module 10 in accordance with a second embodiment of the invention includes an optical path turning unit 20, two enhancing elements 80, a carrier 40, a fixing element 60 and a driver (not shown). The second embodiment differs from the above embodiment in that the optical path turning module 10 of the second embodiment further includes the enhancing elements 80 configured to increase the strength of the optical path turning module 10. The descriptions of the elements in the second embodiment similar to those of the above embodiment are omitted.

Figure 4:
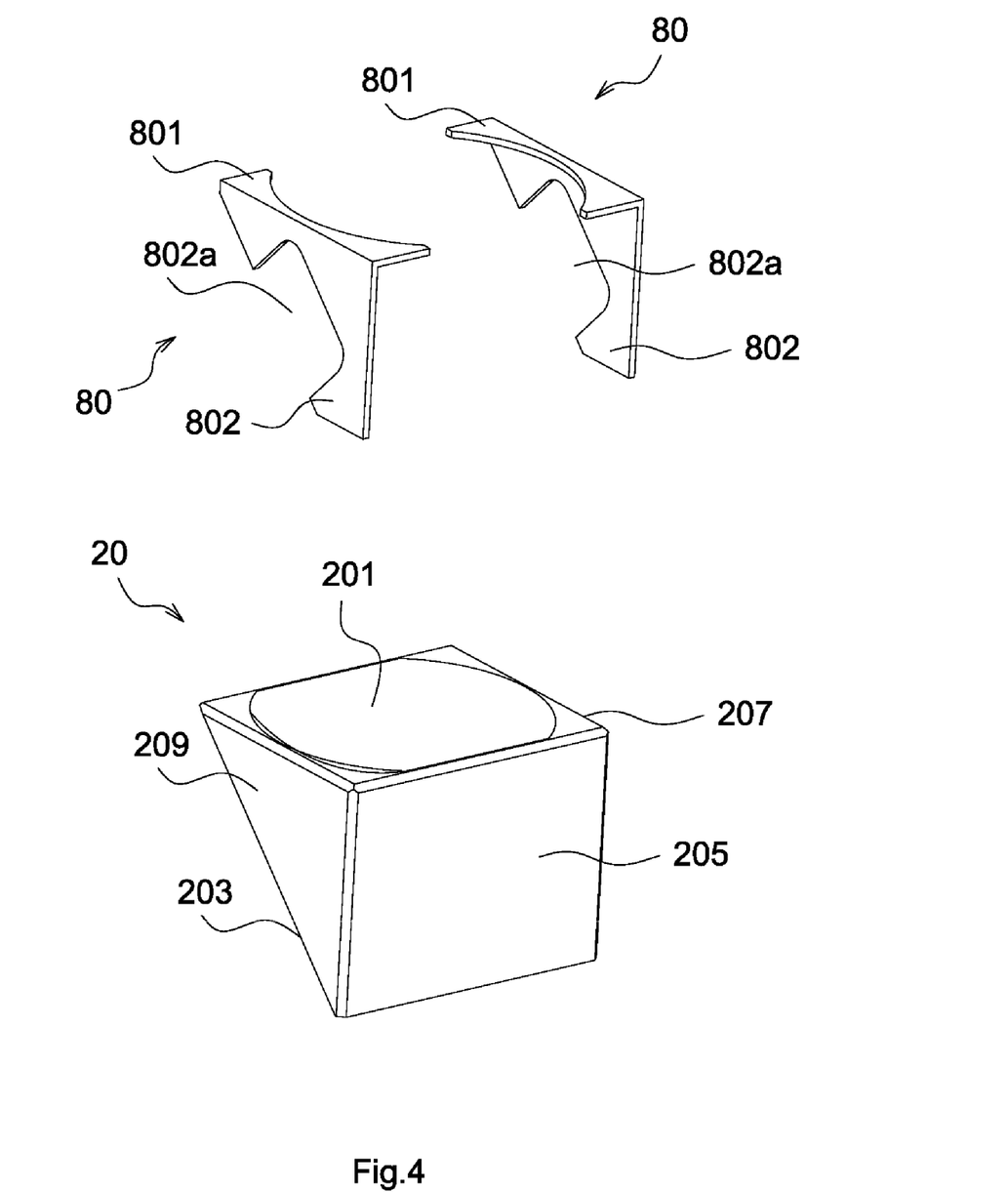
FIG. 4 is an exploded view of enhancing elements and an optical path turning unit of FIG. 3.

Referring to FIG. 4, each of the enhancing elements 80 includes a top part 801 and a lateral part 802. The top part 801 and the lateral part 802 are connected to each other. The lateral part 802 is provided with a notch 802a configured to engage with the second clamping portion 405 of the carrier 40. In the second embodiment, each of the enhancing elements 80 is made of metal and has high structural strength.

As shown in FIGS. 3 and 4, during assembly of the enhancing elements 80 and the optical path turning unit 20, the enhancing elements 80 are respectively fixed on two sides of the optical path turning unit 20. It is noted that glue is put on four corners of the top surface 201 of the optical path turning unit 20, so that the enhancing elements 80 are glued to the top surface 201 of the optical path turning unit 20. In addition, glue is put on the left surface 207 and the right surface 209 of the optical path turning unit 20, so that one of the lateral parts 802 of the enhancing elements 80 is glued to the left surface 207 of the optical path turning unit 20 and another one of the lateral parts 802 of the enhancing elements 80 is glued to the right surface 209 of the optical path turning unit 20. To avoid shielding lights, the top parts 801 of the enhancing elements 80 only cover an edge of the top surface 201 of the optical path turning unit 20. In other words, the top parts 801 of the enhancing elements 80 are arranged in a non-effective-diameter area. The lateral parts 802 of the enhancing elements 80 extend downwards along a direction parallel to the left surface 207 and the right surface 209 of the optical path turning unit 20 for partially covering the left surface 207 and the right surface 209.

When the optical path turning unit 20 on which the enhancing elements 80 are disposed is fixed in the carrier 40, a bottom edge of the enhancing element 80 is arranged to contact a top surface of the first part 4031 of the first clamping portion 403. When the second clamping portions 405 of the carrier 40 clamp two sides of the optical path turning unit 20, the second clamping portion 405 is arranged in the notch 802a and an internal edge of the notch 802a contacts at least one part of outer surfaces of the second clamping portion 405. In other words, the internal edge of the notch 802a contacts at least one part of a top surface, a front surface and a back surface of the second clamping portion 405. In such arrangement, glue can be put between the optical path turning unit 20 and the second clamping portion 405 and can be further put between the internal edge of the notch 802a of the enhancing elements 80 and the second clamping portion 405 for significantly increasing the reliability of gluing. Moreover, two sides of the optical path turning unit 20 are completely covered by the lateral parts 802, the second clamping portions 405 and the first parts 4031 of the first clamping portions 403.

The top surface, the front surface and the back surface of the second clamping portion 405 define an inner part and an outer part which further nears the fixing body 601 of the fixing element 60. It is noting that the enhancing element 80 contact the inner part of the second clamping portion 405, and the limiting portions 6015 are respectively placed against the outer part of the second clamping portion 405.

Internal surfaces of the enhancing elements 80 are provided with optical absorbing coatings for reducing stray lights and eliminating ghost images. In the second embodiment, the optical absorbing coatings comprise black matt ink. In another embodiment, the internal surfaces of the enhancing element 80 are processed to be matte surfaces.

In another embodiment, the enhancing elements 80 still have the lateral parts 802 while the top parts 801 are omitted.

The optical path turning module 10 of the second embodiment enhances the connection between the optical path turning unit 20 and the carrier 40 so as to increase reliability thereof.

Figure 5:
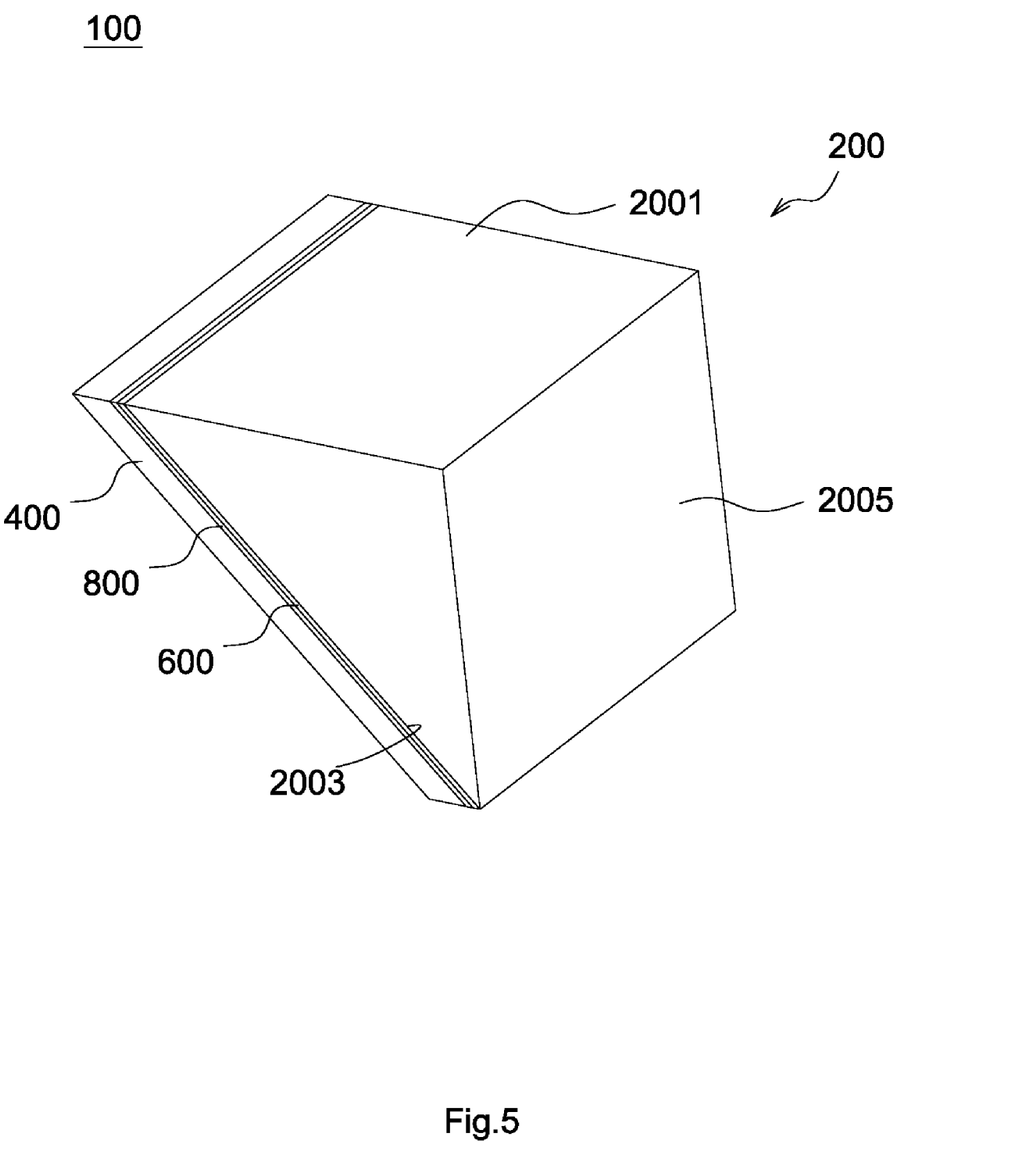
FIG. 5 is a schematic view of an optical path turning unit of an optical path turning module in accordance with a third embodiment of the invention.

An optical path turning module in accordance with a third embodiment of the invention includes an optical path turning unit 100, a carrier (not shown), a fixing element (not shown) and a driver (not shown). The third embodiment differs from the above embodiments in the structure of the optical path turning unit 100. The descriptions of the elements of the third embodiment similar to those of the above embodiments are omitted.

Figure 6:
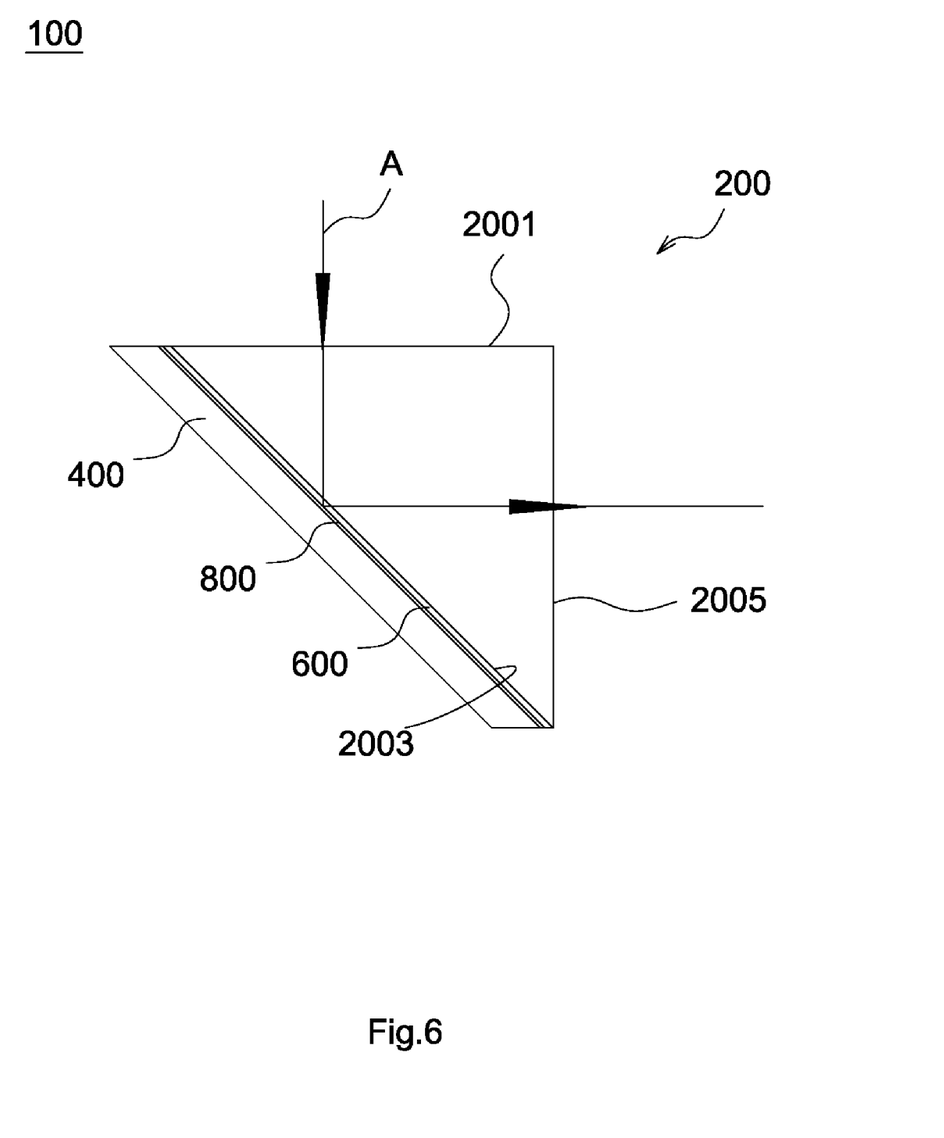
FIG. 6 is a side view of the optical path turning unit of FIG. 5.

Referring to FIG. 5, the optical path turning unit 100 includes a main body 200, a reflecting element 400, a reflecting layer 800 and an adhesive layer 600. The main body 200 includes a top surface 2001, a front surface 2005 and a sloping surface 2003. Referring to FIG. 6, the reflecting layer 800 is disposed on a surface of the reflecting element 400 facing the sloping surface 2003, and the adhesive layer 600 contacts the reflecting layer 800 and the sloping surface 2003 of the main body 200 so that the sloping surface 2003, the reflecting element 400 and the reflecting layer 800 are parallel to each other. The sloping surface 2003 of the main body 200, the adhesive layer 600, the reflecting layer 800 and the reflecting element 400 are sequentially arranged.

It is worth noting that the sloping surface 2003 of the main body 200 is opposite to a first angle between the top surface 2001 and the front surface 2005, and the sloping surface 2003, the top surface 2001, the front surface 2005 and two lateral surfaces constitute an enclosed space. The top surface 2001, the front surface 2005 and the sloping surface 2003 constitute an isosceles triangle when they are observed in a direction perpendicular to the lateral surfaces of the optical path turning unit 100, wherein the sloping surface 2003 is a bottom side of the isosceles triangle while the top surface 2001 and the front surface 2005 are two sides with equal length of the isosceles triangle. The first angle between the top surface 2001 and the front surface 2005 is greater than a second angle between the sloping surface 2003 and the top surface 2001. Also, the first angle between the top surface 2001 and the front surface 2005 is greater than a third angle between the sloping surface 2003 and the front surface 2005. As shown in FIG. 6, the top surface 2001 and the front surface 2005 are connected and perpendicular to each other, the second angle at which the top surface 2001 and the sloping surface 2003 are intersected is 45 degrees, and the third angle at which the front surface 2005 and the sloping surface 2003 are intersected is 45 degrees.

As shown in FIG. 6, during operation, a light beam A enters the optical path turning unit 100 through the top surface 2001 along a first axis (not shown), passes through the sloping surface 2003 of the main body 200 and the adhesive layer 600, is reflected by the reflecting layer 800 on the reflecting element 400 for changing the traveling direction, passes through the adhesive layer 600 and the sloping surface 2003 of the main body 200 again, and leaves the optical path turning unit 100 through the front surface 2005 of the main body 200 along a second axis (not shown). In the third embodiment, the first axis is perpendicular to the top surface 2001 of the main body 200, and the second axis is perpendicular to the front surface 2005 of the main body 200.

In the third embodiment, the main body 200 is a prism formed as one piece and made of light-penetrable glass or plastic (for example, acrylic or glass-like material mostly consisting of polysiloxane, where acrylic is known as plastic glass which is made of plastic and is as transparent as glass). The reflecting element 400 is a glass sheet. The reflecting layer 800 is a reflecting film. The adhesive layer 600 is optical cement and is configured to attach the main body 200 to the reflecting layer 800 by fusion.

If the main body 200 is a prism made of plastic rather than glass, then the weight of the optical path turning module of the third embodiment can be reduced while the volume of the main body 200 is the same. Therefore, the force and the loading required to drive the optical path turning module by a camera device (not shown) can be reduced, wherein the optical path turning module is carried by the camera device. Alternatively, the volume of the optical path turning module of the third embodiment can be increased while the weight of the main body 200 is the same. Then, the optical effective diameter can be increased, so that the resolution and the brightness of the camera device can be improved. Further, the reflecting element 400 is a glass sheet in the third embodiment that requires flat work done on two lateral surfaces of the glass sheet during the manufacturing process. As compared to processing a glass prism, processing a glass sheet is easier and with higher accuracy.

In another embodiment, the reflecting element 400 is a metal sheet or a sheet made of other material capable of reflecting lights (e.g. aluminum sheet, aluminum film, copper sheet, iron sheet, platinum sheet, silver sheet or steel sheet), the reflecting layer 800 is omitted, and the adhesive layer 600 contacts the reflecting element 400 and the sloping surface 2003 of the main body 200. When the reflecting element 400 is a metal sheet (or a sheet made of other material capable of reflecting light) and the reflecting layer 800 is omitted, a light beam (not shown) enters the optical path turning unit 100 through the top surface 2001 along a first axis (not shown), passes through the sloping surface 2003 of the main body 200 and the adhesive layer 600, is reflected by the reflecting element 400 for changing an optical path thereof, passes through the adhesive layer 600 and the sloping surface 2003 of the main body 200 again, and leaves the optical path turning unit 100 through the front surface 2005 of the main body 200 along a second axis (not shown).

In yet another embodiment, the reflecting element 400 is a metal sheet and is provided with the reflecting layer 800. It is worth noting that the reflecting layer 800 is a sputtering film configured to increase the reflectivity of the reflecting element 400, and the sputtering film is coated on a surface of the reflecting element 400 facing the sloping surface 2003. In such arrangement, the reflectivity of the reflecting element 400 is increased from a first range (85-92 percent)

to a second range (93-98 percent). In operation, a light beam (not shown) enters the optical path turning unit 100 through the top surface 2001 along a first axis (not shown), passes through the sloping surface 2003 of the main body 200 and the adhesive layer 600, is mostly reflected by the reflecting layer 800 for changing the traveling direction, passes through the adhesive layer 600 and the sloping surface 2003 of the main body 200 again, and leaves the optical path turning unit 100 through the front surface 2005 of the main body 200 along a second axis (not shown). In addition, a minority of the light beam passes through the reflecting layer 800, arrives the reflecting element 400, is reflected by the reflecting element 400 for changing the traveling direction, passes through the reflecting layer 800, the adhesive layer 600 and the sloping surface 2003 of the main body 200 again, and leaves the optical path turning unit 100 through the front surface 2005 of the main body 200 along the second axis.

Figure 7:
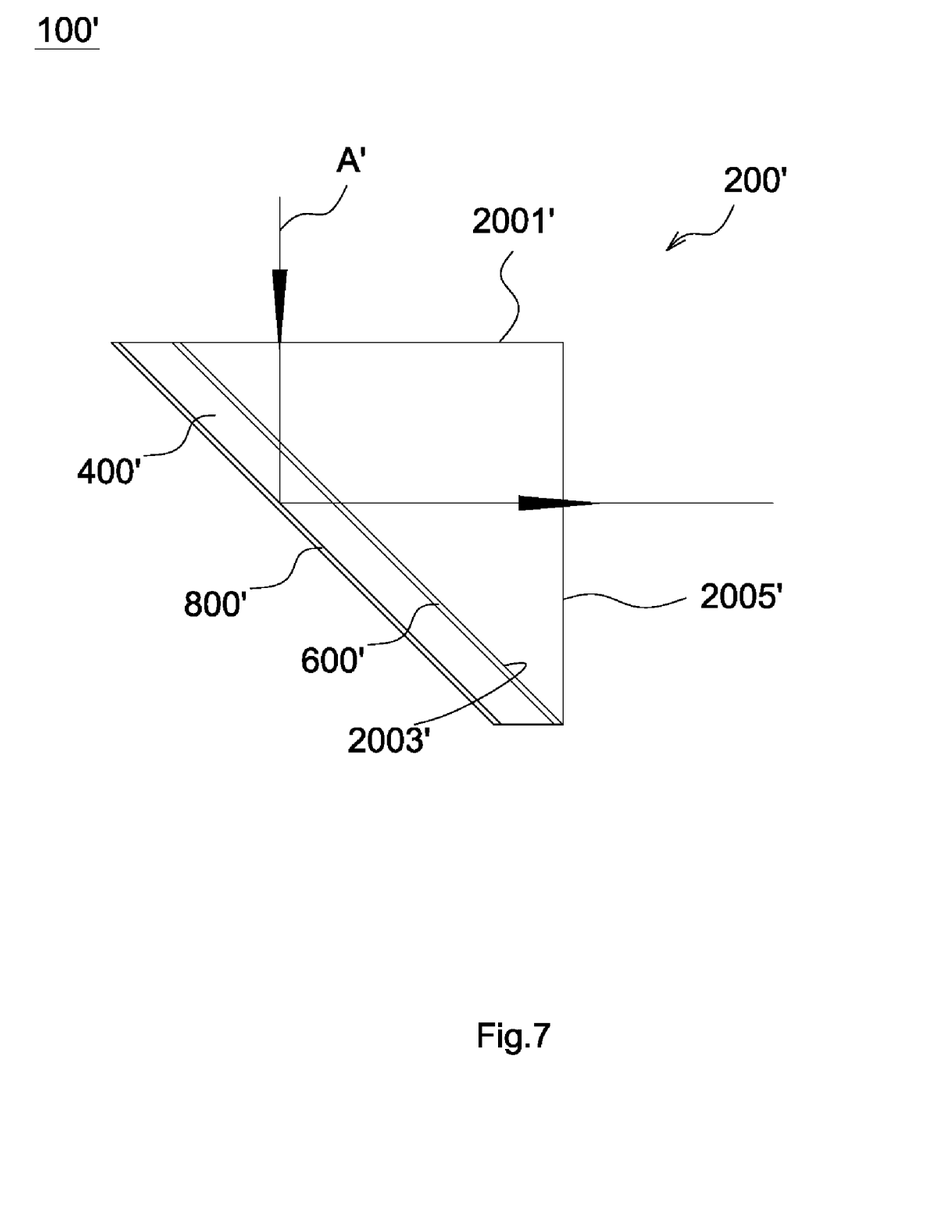
FIG. 7 is a side view of an optical path turning unit of an optical path turning module in accordance with a fourth embodiment of the invention.

An optical path turning module in accordance with a fourth embodiment of the invention includes an optical path turning unit 100', a carrier (not shown), a fixing element (not shown) and a driver (not shown). The difference between the fourth embodiment and the above embodiments is the structure of the optical path turning unit 100'. The descriptions of the elements of the fourth embodiment similar to those of the above embodiments are omitted.

Referring to FIG. 7, the optical path turning unit 100' includes a main body 200', a reflecting element 400', a reflecting layer 800' and an adhesive layer 600'. The main body 200' includes a top surface 2001', a front surface 2005' and a sloping surface 2003'. The reflecting layer 800' is coated on a surface of the reflecting element 400' opposite to the sloping surface 2003'. Another surface of the reflecting element 400' facing the sloping surface 2003' contacts the adhesive layer 600'. The adhesive layer 600' contacts the sloping surface 2003' of the main body 200'. Therefore, the sloping surface 2003' of the main body 200', the adhesive layer 600', the reflecting element 400' and the reflecting layer 800' are sequentially arranged.

In the fourth embodiment, the reflecting element 400' is a glass sheet, the reflecting layer 800' is a reflecting film, and the adhesive layer 600' is optical cement and is configured to attach the main body 200' to the reflecting element 400' by gluing, insert molding or fusion.

As shown in FIG. 7, during operation, a light beam A' enters the optical path turning unit 100' through the top surface 2001' along a first axis (not shown), passes through the sloping surface 2003' of the main body 200', the adhesive layer 600' and the reflecting element 400', is reflected by the reflecting layer 800' for changing the traveling direction, passes through the reflecting element 400', the adhesive layer 600' and the sloping surface 2003' of the main body 200' again, and leaves the optical path turning unit 100' through the front surface 2005' of the main body 200' along a second axis (not shown).

Figure 8:
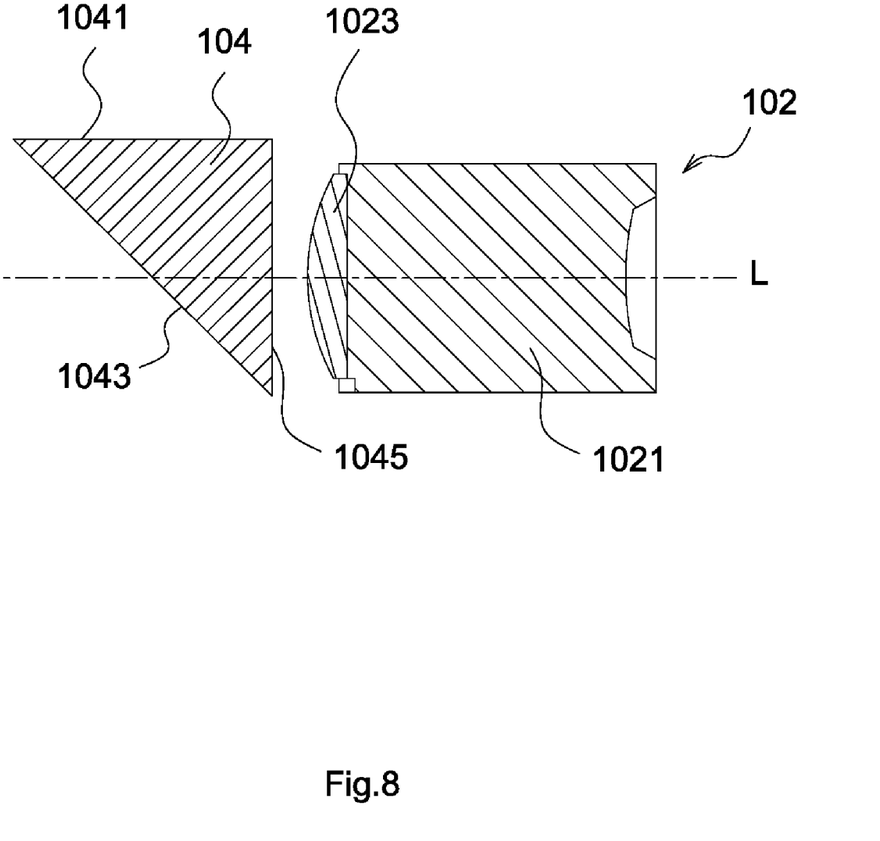
FIG. 8 is a side view of an optical path turning unit of an optical path turning module in accordance with a fifth embodiment of the invention, wherein the optical path turning unit is disposed adjacent to a camera module.

Referring to FIG. 8, in a fifth embodiment, a camera module 102 is adjacent to a front surface 1045 of an optical path turning unit 104 of an optical path turning module and includes a lens barrel 1021 and at least one lens 1023. An optical axis L perpendicular to the front surface 1045 and parallel to a top surface 1041 is formed to pass through a center of the lens 1023. During operation, a light beam (not shown) entering the optical path turning module enters the optical path turning unit 104 through the top surface 1041, is reflected by a sloping surface 1043 of the optical path turning unit 104, and enters the camera module 102 through the front surface 1045 of the optical path turning unit 104.

The arrangement of other elements and operation are similar to those of the above embodiment, and therefore the descriptions thereof are omitted. It is understood that the optical path turning unit 104 of the fifth embodiment can be replaced with the optical path turning unit 100 of the third embodiment or optical path turning unit 100' of the fourth embodiment.

What is claimed is:

1. An optical path turning module, comprising:
   an optical path turning unit comprising a sloping surface, wherein a light beam enters the optical path turning unit along a first axis, is reflected by the sloping surface for changing a traveling direction thereof, and leaves the optical path turning unit along a second axis;
   a carrier configured to fix the optical path turning unit and comprising a main body, a plurality of first clamping portions and a plurality of second clamping portions, wherein the main body is sloped with respect to the second axis, the first clamping portions extend forwards from two sides of the main body in a direction parallel to the second axis, and the second clamping portions extend obliquely and upwards from two sides of the main body and clamp the optical path turning unit;
   a fixing element, with the carrier disposed therein; and
   a driver disposed between the carrier and the fixing element and configured to drive the carrier to rotate about a third axis with respect to fixing element, wherein the third axis is perpendicular to the first axis and the second axis.

2. The optical path turning module as claimed in claim 1, wherein the carrier further comprises a plurality of locating portions extending outwards from two sides of the main body in a direction parallel to the third axis.

3. The optical path turning module as claimed in claim 2, wherein the optical path turning unit further comprises a top surface, a left surface, a right surface and a front surface;
   wherein the first clamping portions comprise a plurality of first parts and a plurality of second parts, the first parts clamp the left surface and the right surface, and the second parts are placed against the front surface;
   wherein the second clamping portions clamp the left surface and the right surface.

4. The optical path turning module as claimed in claim 3, wherein the locating portions comprise a supporting portion and a pivoting portion, the supporting portion extends outwards from the main body, and the pivoting portion extends obliquely and downwards from a center of a bottom surface of the supporting portion.

5. The optical path turning module as claimed in claim 4, wherein the fixing element comprises a plurality of fixing bodies, each of the fixing bodies is provided with a recess configured to accommodate the locating portion and comprising two supporting surfaces, a space and two limiting portions, the supporting surfaces are configured to support the supporting portion, the space is between the supporting surfaces and is configured to allow rotation of the pivoting portion, and the limiting portions are disposed obliquely above the supporting surfaces and are placed against a part of a top surface of the second clamping portion.

6. The optical path turning module as claimed in claim 3, further comprising a plurality of enhancing elements, wherein each of the enhancing elements comprises a top part and a lateral part, the top part is disposed on the top surface and is connected to the lateral part, and the lateral part is fixed on the left surface or the right surface and extends to a top surface of the first clamping portions.

7. The optical path turning module as claimed in claim 6, wherein each of the lateral parts is provided with a notch configured to engage with the second clamping portion, and an internal edge of the notch contacts at least one part of outer surfaces of the second clamping portion.

8. The optical path turning module as claimed in claim 7, wherein the top parts of the enhancing elements are arranged in a non-effective-diameter area of the top surface.

9. The optical path turning module as claimed in claim 6, wherein the left surface and the right surface of the optical path turning unit are completely covered by the lateral parts, the second clamping portions and the first parts of the first clamping portions.

10. The optical path turning module as claimed in claim 9, wherein a bottom edge of the enhancing elements is arranged to contact a top surface of the first parts of the first clamping portions.

11. The optical path turning module as claimed in claim 3, wherein the optical path turning unit further comprises a reflecting element and an adhesive layer, the adhesive layer is between the reflecting element and the sloping surface, and the sloping surface, the adhesive layer and the reflecting element are sequentially arranged.

12. The optical path turning module as claimed in claim 11, wherein the optical path turning unit further comprises a reflecting layer coating on the reflecting element, and the reflecting layer is reflecting film.

13. The optical path turning module as claimed in claim 12, wherein a first angle at which the top surface and the front surface are intersected is greater than a second angle at which the sloping surface and the top surface or the front surface are intersected.

14. The optical path turning module as claimed in claim 12, wherein the reflecting element is glass sheet, a surface of the reflecting element facing the sloping surface is attached to the sloping surface through the adhesive layer, and another surface of the reflecting element opposite to the sloping surface is coated with the reflecting layer.

15. The optical path turning module as claimed in claim 14, wherein the light beam enters the optical path turning unit through the top surface, passes through the sloping surface, the adhesive layer and the reflecting element, is reflected by the reflecting layer for changing the optical path thereof, passes through the reflecting element, the adhesive layer and the sloping surface again, and leaves the optical path turning unit through the front surface.

16. The optical path turning module as claimed in claim 12, wherein the reflecting element is metal sheet, a surface of the reflecting element facing the sloping surface is coated with the reflecting layer, and the reflecting layer is attached to the sloping surface through the adhesive layer.

17. The optical path turning module as claimed in claim 16, wherein the light beam enters the optical path turning unit through the top surface, passes through the sloping surface and the adhesive layer, is mostly reflected by the reflecting layer for changing the optical path thereof, passes through the adhesive layer and the sloping surface again, and leaves the optical path turning unit through the front surface;
wherein a minority of the light beam passes through the reflecting layer, is reflected by the reflecting element for changing the optical path thereof, passes through the reflecting layer, the adhesive layer and the sloping surface again, and leaves the optical path turning unit through the front surface.

18. The optical path turning module as claimed in claim 1, wherein the second clamping portions comprise a first part, a second part and a third part, the first part extends obliquely and upwards from the main body, and the second part and the third part respectively extend vertically from two ends of the first part;
wherein the carrier further comprises a plurality of locating portions extending outwards from two sides of the main body in a direction parallel to the third axis, the locating portions comprise a supporting portion and a pivoting portion, the supporting portion extends outwards from the main body, and the pivoting portion extends obliquely and downwards from a center of a bottom surface of the supporting portion;
wherein the fixing element comprises a plurality of fixing bodies, each of the fixing bodies is provided with a recess configured to accommodate the locating portion and comprising two supporting surfaces, a space and two limiting portions, the supporting surfaces are configured to support the supporting portion, the space is between the supporting surfaces and is configured to allow rotation of the pivoting portion, and the limiting portions are disposed obliquely above the supporting surfaces and are placed against a part of a top surface of the second clamping portion.

19. The optical path turning module as claimed in claim 1, wherein the carrier further comprises a plurality of first protruding portions and a plurality of second protruding portions, the first protruding portions respectively extend backwards from two sides of a top portion of the main body in the direction parallel to the second axis, and the second protruding portions respectively extend downwards from two sides of a bottom portion of the main body in a direction parallel to the first axis.

20. The optical path turning module as claimed in claim 19, wherein the fixing element further comprises a back plate and a bottom plate, the back plate comprises a plurality of first depressed portions configured to engage with the first protruding portions, and the bottom plate comprises a plurality of second depressed portions configured to engage with the second protruding portions.

\* \* \* \* \*